Oct. 4, 1932.    H. A. WADMAN    1,880,541
PROCESS AND APPARATUS FOR MAKING GLASS
Filed Oct. 21, 1930    2 Sheets-Sheet 1
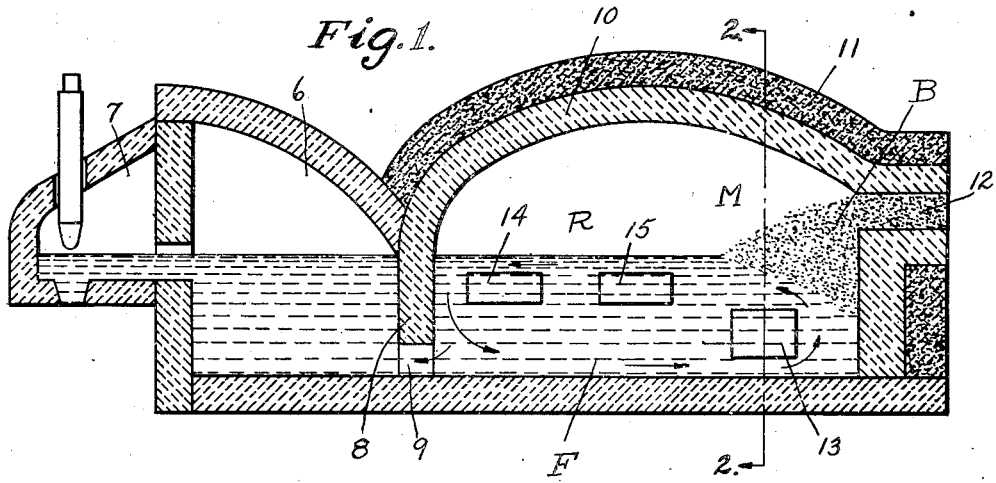
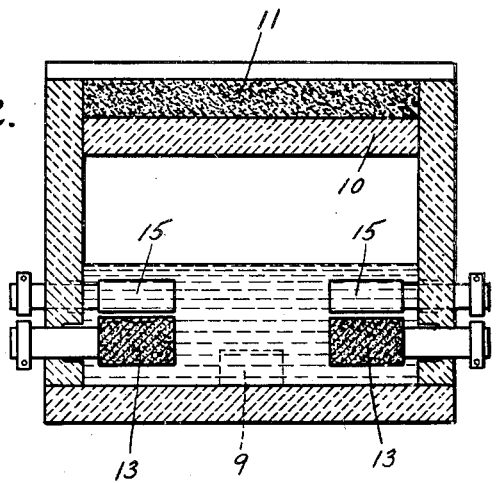
Witness:
G. G. Duberg.
Inventor;
Harold A. Wadman.
by Brown & Parham
Attorneys.

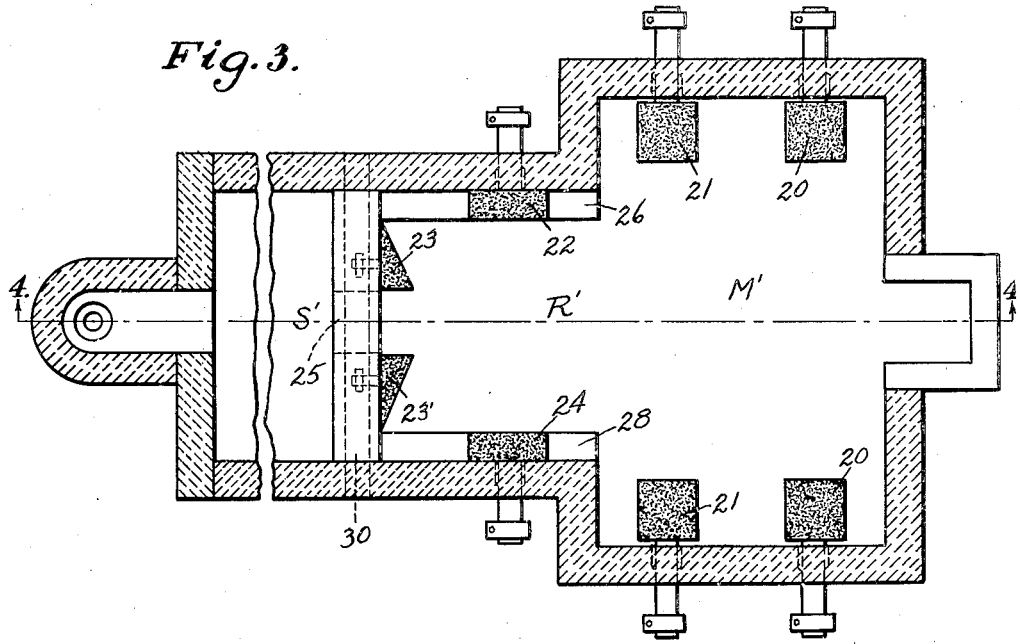
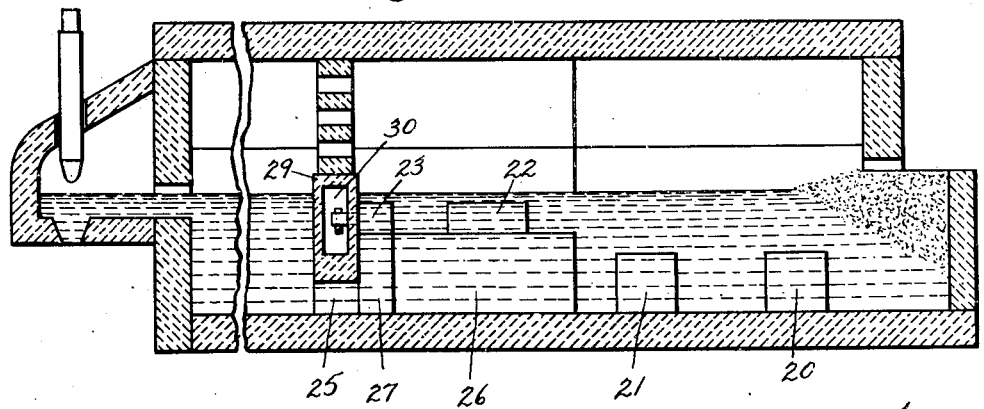

Patented Oct. 4, 1932

1,880,541

UNITED STATES PATENT OFFICE

HAROLD A. WADMAN, OF HARTFORD, CONNECTICUT, ASSIGNOR TO HARTFORD-EMPIRE COMPANY, OF HARTFORD, CONNECTICUT, A CORPORATION OF DELAWARE

PROCESS AND APPARATUS FOR MAKING GLASS

Application filed October 21, 1930. Serial No. 490,213.

This invention relates to apparatus for and methods of melting glass, and more particularly relates to the melting of glass by the use of the glass itself as the resistor for a current of electricity. The invention contemplates the use of a tank structure comprising a melting portion, a refining portion and a conditioning portion the last two of which are substantially separate, in the first two of which portions electric current is so applied to the glass that it will most efficiently perform the work to be done in each portion of the tank. The invention also contemplates the use of a tank of such a construction that heat arising from the surface of the glass in the refining portion will be reflected back upon the batch in the melting portion to heat the top surface of the incoming batch and thus aid in its formation into glass.

One object of my invention is to provide a furnace for the electric melting of glass which heats the incoming batch pile from below by means of a stream of highly heated molten glass, and from above by heat radiated from the free surface of the glass to the crown and thence to the upper surface of the batch pile.

Another object of my invention is to provide an efficient apparatus for producing molten glass that consists primarily in a furnace structure provided with electrodes so located that in the melting portion of the furnace, batch will be melted into glass as rapidly as possible, and provided with other electrodes so located in the refining chamber that the melted glass may give up any gases included therein as rapidly as possible.

Another object of my invention is to increase the efficiency of such a furnace by utilizing the heat arising from the surface of the glass in the refining portion to heat the incoming batch.

Still another object of my invention is to provide a circulation of glass within the furnace whereby a current of highly heated glass will be brought into contact with the bottom of a pile of batch fed into the tank to reduce the batch to glass, said current incorporating such newly made glass being again heated near the surface of the glass bath to facilitate the passage therefrom of included gases.

Other objects and advantages of my invention will appear from the specification and the drawings, in which:

Figure 1 is a vertical section of my invention showing the relative locations of the electrodes and the shape of the reflecting roof of the tank;

Fig. 2 is a transverse vertical section taken on the line 2—2 of Fig. 1;

Fig. 3 is a horizontal section of a modified form of my invention; and

Fig. 4 is a vertical longitudinal section taken on the line 4—4 of Fig. 3.

Referring particularly to Fig. 1, a furnace F comprises a melting section M, a refining section R, a conditioning section 6, and a forehearth 7. A bridge wall 8, in which is a submerged throat 9, separates the melting section M and the refining section R from the conditioning chamber 6. A roof 10 over the melting and refining chambers is composed of suitable refractory material and may be covered by a layer of insulating material 11. An opening 12 in one end of the tank provides means for feeding batch in any preferred manner to the interior thereof.

A pair of electrodes 13, preferably of graphite, is located in the melting end M of the tank at a level below that at which batch will ordinarily sink. These electrodes preferably are coupled to a source of single-phase, alternating current so that a current of electricity may pass continuously therebetween underneath the batch, and thus heat the molten glass through which it passes. The heated glass rises in accordance with the thermo-dynamic laws, passes along the bottom and edge of the batch pile B toward the forward end of the tank and into the refining section R. As the current passes the batch pile and melts portions of the batch into glass, it is cooled by such action. The current of glass then passes through an electric current passing between electrodes 15, 15 and 14, 14, where it is again heated. As will be obvious from Fig. 1, these electrodes are located at but a slight distance below the glass level in the tank and the current therebetween will heat the glass adjacent the surface. Thus the glass which passes between electrodes 15, 15 and 14, 14 is raised to a high temperature and the bubbles and gases which are included in the stream from the newly melted glass may escape and the glass thus be made clear and homogeneous.

At the same time that current is flowing in the direction above pointed out, glass is being withdrawn from the feeder outlet and another current is flowing down past the wall 8 of the tank and through the submerged throat 9, and thus draws glass from the melting and refining portions of the tank into the conditioning chamber 6.

The current of glass after passing between the electrodes 15, 15 and 14, 14 comes into contact with the wall 8, is somewhat cooled thereby, and due to its increased weight and to the pull of glass passing through the throat 9 sinks to the bottom of the tank where a portion thereof is drawn through the throat 9 and another portion thereof is drawn into the current caused by the heating of the glass between the electrodes 13, 13 and follows the current past the electrodes 13, 13 and again past the batch pile.

In order to increase the efficiency of the furnace and to utilize to the fullest extent the heat generated in the glass, I construct my roof 10 as is shown in Fig. 1 in the shape of a flattened arch of approximately elliptical shape, so that heat arising from the glass in the refining portion of the tank over the electrodes 14, 14 and 15, 15 is concentrated upon the upper surface of the incoming batch, so that the batch as it comes into contact with the glass is heated from above by heat reflected from the refining portion of the tank and concentrated thereon. Thus the batch is more readily melted when it comes into contact with the hot current of glass rising between the electrodes 13, 13.

The above described method of melting glass may be also employed with the apparatus disclosed in the embodiment of my invention shown in Figs. 3 and 4. The furnace proper of these figures is divided roughly as in Fig. 1 into a melting section M', a refining section R', and a conditioning section S'. The melting section M' is, however, of greater width and length than the section M of the first embodiment of my invention, and I have provided therein two pairs of electrodes 20, 20 and 21, 21, which correspond to the electrode 13 shown in Fig. 1. By these electrodes, however, I provide a larger area in which the glass is heated to a high temperature near the bottom of the tank. The refining section R' is of relatively less width and length than that disclosed in the first embodiment of my invention and instead of locating the electrodes as in Fig. 1 for the use of single phase current, I locate electrodes 22, 23, 23' and 24 as shown for the use of three-phase alternating current and thus provide an active heating current across the corners of the chamber, which tends to eliminate undesirable pockets of cold glass in the corners.

It will be noted from Fig. 3 that the electrodes 23, 23' are placed on either side of a submerged throat 25 connecting the conditioning chamber S' with the refining and melting chambers, and that thus I insure a thorough heating of the glass immediately before it passes into the conditioning chamber. In order to prevent the heads of the electrodes 22, 23, etc. from breaking off from the necks thereof, I provide refractory supports 26, 27 and 28 composed of substantially the same material as that of which the tank itself is built, upon which the heads of the electrodes rest and which not only supports the heads of the electrodes but also prevents to some extent a washing or wave movement of the molten glass thereagainst.

By referring to Fig. 4, it will be noticed that the electrodes 23 and 23' rest against a bridge wall 29 which has a hollow portion 30 into which the neck of the electrodes 23, 23' extend and through which they are connected to a source of electrical current.

The tank shown in Figs. 3 and 4 may be provided with the same type of roof as is shown in Fig. 1 for reflecting heat from the refining portion of the tank back upon the incoming batch.

While herein I refer specifically to glass as the substance melted, it is to be understood that this term as used in the specification and in the claims is sufficiently broad to cover not only the melting of glass in a restrictive sense but similar substances such as soluble silicates of soda, aluminous silicates such as cements, and enamels which have somewhat similar characteristics.

It is likewise to be understood that the above-entitled embodiments of my invention are for the purpose of illustration only and that various changes may be made therein without departing from the spirit and scope of the invention as set out in the following claims:

For my invention I claim:

1. An electric glass melting furnace comprising a glass container, means for supplying glass-making batch to one end of said container, means for passing a current of electricity through the glass beneath the batch to bring into contact with said batch highly heated molten glass to melt said batch into glass, and means to pass a current of electricity through the upper layer of said glass to maintain a portion of said layer in a condition of fluidity as great as that therebelow.

2. An electric glass melting furnace comprising a glass container, means for feeding glass-forming materials into said container, a pair of electrodes in said container adjacent the bottom of the container near the end at which said glass-forming materials are fed for maintaining the glass beneath said glass-forming materials at a high temperature, and other electrodes placed adjacent the upper surface of the glass in said container in a part of said container remote from the end into which the glass-forming materials are fed to maintain the surface of the glass in said part in a sufficiently fluid condition to permit the escape of gases therethrough.

3. An electric glass melting furnace comprising a melting chamber, a conditioning chamber, a submerged throat between said chambers, means to heat the surface of the glass contained in said melting chamber at a point above said throat, and means for heating glass contained in said melting chamber at a point adjacent the bottom of said furnace and remote from said throat to assure a circulation of said glass.

4. A glass melting furnace comprising a conditioning chamber, a melting chamber, a submerged throat between said melting chamber and said conditioning chamber, electrodes positioned in the melting chamber immediately adjacent to the opening into said throat, and means for causing a circulation of glass between said electrodes and for causing a circulation of the glass which has passed between said electrodes in part through said throat and in part away from said throat.

5. The method of melting glass which comprises maintaining a bath of glass in a tank, depositing glass-forming materials on one portion of said bath, causing a circulation of molten glass past said glass-forming materials, heating the upper surface of the glass circulated past said materials, thereafter circulating a portion of the glass away from the remainder of the glass contained in said bath and the second portion to the position where it will again rise into contact with said glass-forming materials.

6. The method of circulating glass in an electric glass melting tank which comprises heating glass near the bottom of the tank to a temperature above the temperature of other portions of glass contained in the tank and thereby causing such highly heated glass to rise, passing said glass past glass-forming material or batch and thereby melting said batch into glass, thereby lowering the temperature of said highly heated glass to that less than the temperature to which it was previously heated, including by such melting of batch a large amount of gas forming material in said glass, heating the portion of the glass containing gas forming material to a temperature at which the gases are readily given off, maintaining said glass at said last-named temperature until a great portion of said gases have been given off, passing the glass after the gases have been given off partially to a conditioning chamber and partially to the position at which it was first heated, and carrying on the process continuously.

7. The method of melting glass which comprises maintaining a bath of glass in a tank, depositing glass-forming materials on one portion of said bath, causing a circulation of glass beneath and past said glass-forming materials, heating the upper surface of the glass after it has circulated past said glass-forming materials, and reflecting the heat from said heated surface of the glass back upon said incoming glass-forming materials to heat said materials from above.

8. The method of melting glass which comprises maintaining a bath of glass in a tank, heating a portion of the surface of said glass from beneath, feeding glass-forming materials to said tank, and concentrating the reflected heat from substantially the entire surface of the heated glass upon the incoming glass-forming materials.

9. Apparatus for melting glass which comprises a glass container, means for heating from beneath a portion of the surface of glass in said tank, means for feeding glass-forming materials to said tank, and means for concentrating upon said glass-forming materials the heat radiating from the heated surface of the glass.

10. A glass melting furnace, comprising adjoining melting and refining chambers in the lower portion of which is contained a bath of molten glass, means for feeding glass-forming materials into said chambers adjacent to one wall, means for heating the glass in said chambers, and a substantially elliptically shaped roof for said chambers to concentrate the heat reflected from that portion of the surface of the bath of glass therein which is not covered by the glass-forming materials upon the upper surface of such materials to assist in the melting thereof.

Signed at Hartford, Connecticut, this 16th day of October, 1930.

HAROLD A. WADMAN.